United States Patent
Dunn

[15] 3,664,057
[45] May 23, 1972

[54] MOUNTING ASSEMBLY

[72] Inventor: Thomas J. Dunn, P.O. Box 110, Hackettstown, N.J. 07840

[22] Filed: Mar. 18, 1970

[21] Appl. No.: 20,601

[52] U.S. Cl. ..............................................56/10.4, 56/14.9
[51] Int. Cl. ..........................................................A01d 69/00
[58] Field of Search ............................................56/10.4, 14.9

[56] References Cited

UNITED STATES PATENTS 2,840,974  7/1958  Dunn et al. ..............................56/10.4
2,729,044  1/1956  Dunn et al. ..............................56/10.4

Primary Examiner—Louis G. Mancene
Assistant Examiner—A. Heinz
Attorney—Robert G. McMorrow

[57] ABSTRACT

A lift and breakaway mounting assembly for connecting an implement to a prime mover includes a laterally mounted hinge plate with a spring case. The plate is pivotal with respect to the prime mover, and the case is pivotal with respect to the plate. An implement mount is operatively associated with the case by a heavy spring, whereby the implement mount is yieldably secured to the case and plate.

6 Claims, 7 Drawing Figures

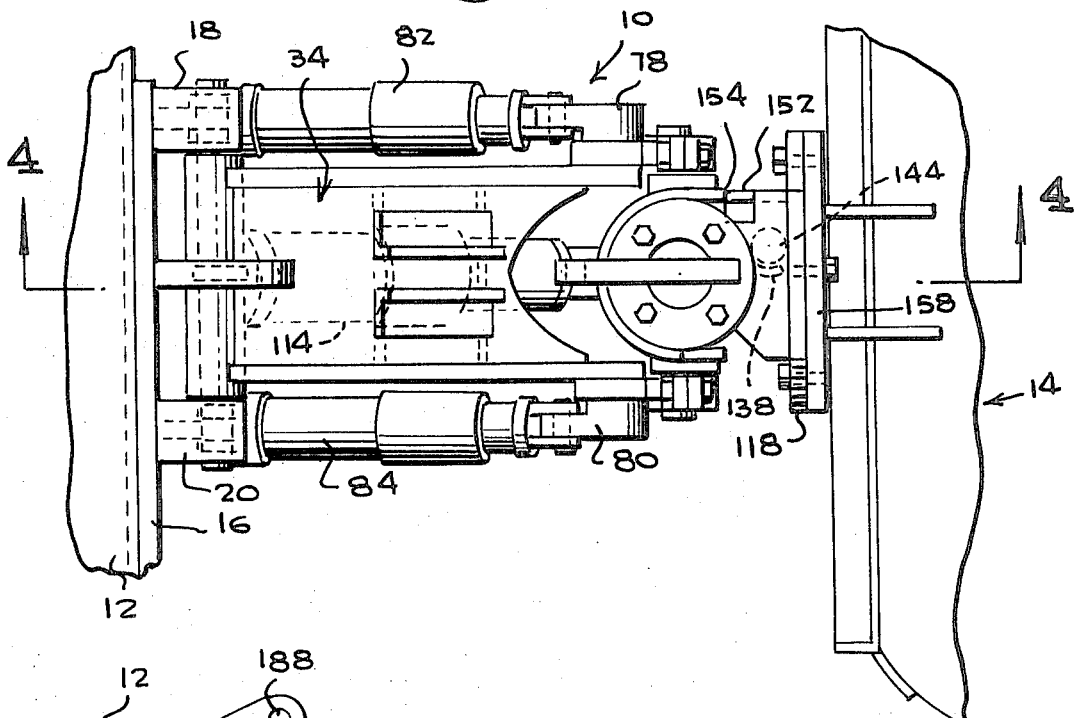
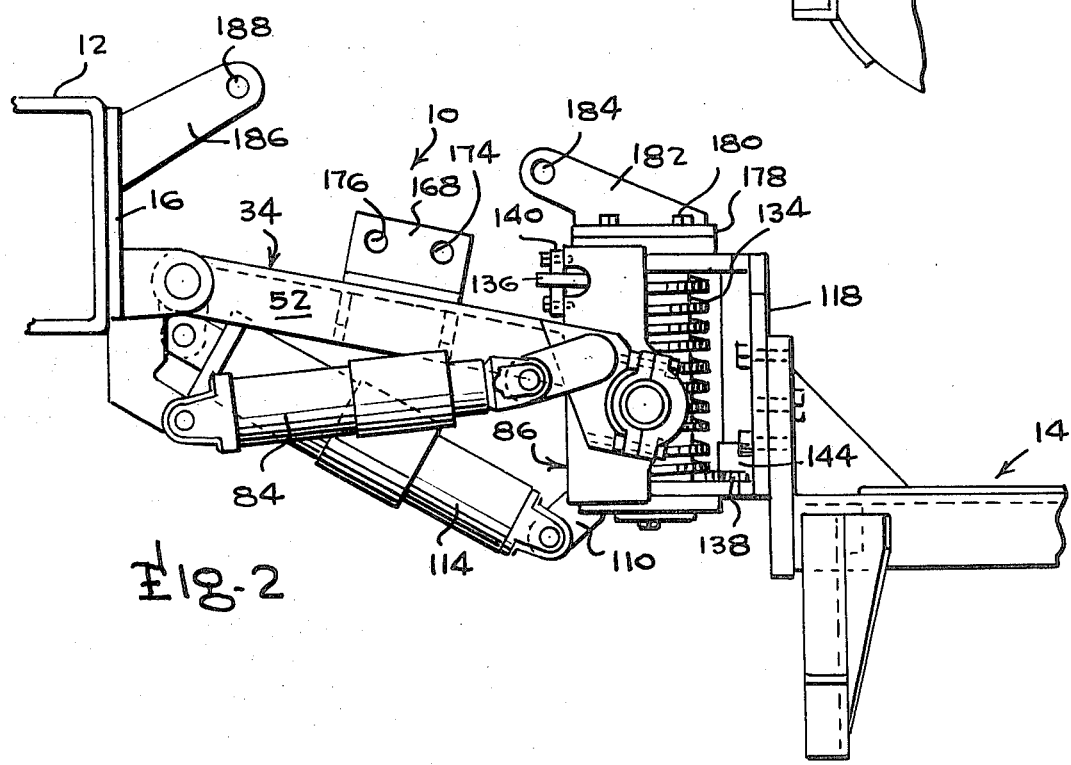

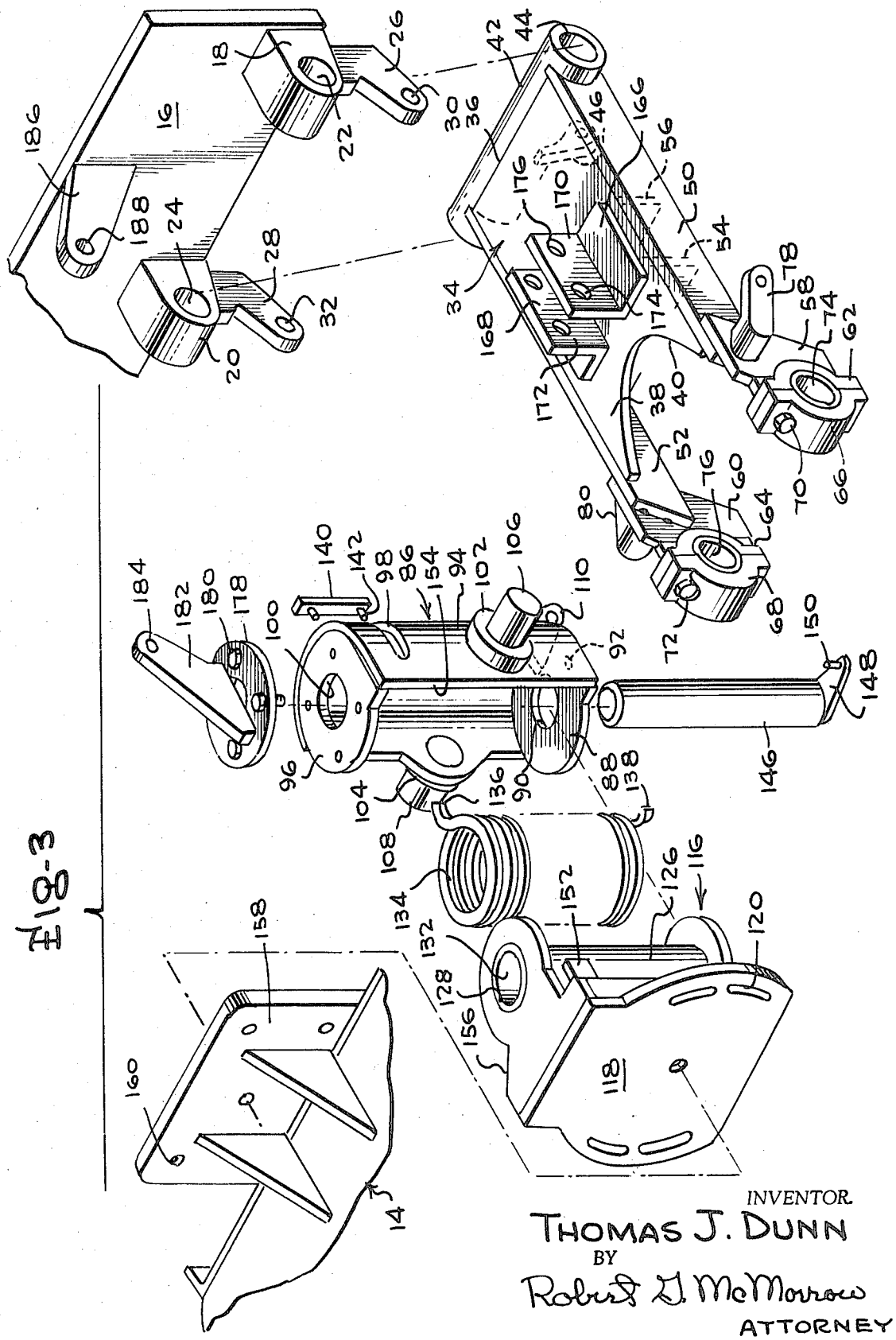

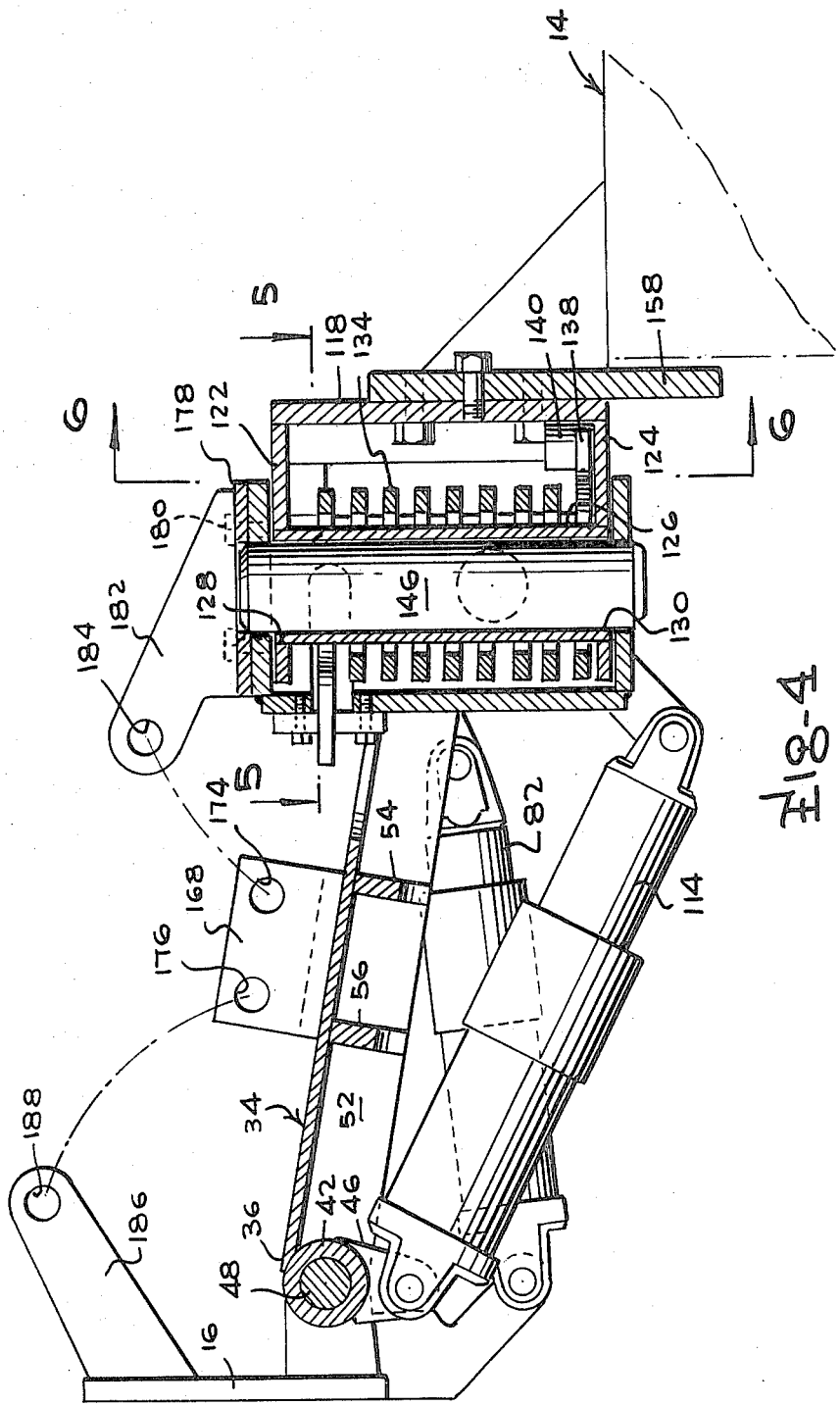

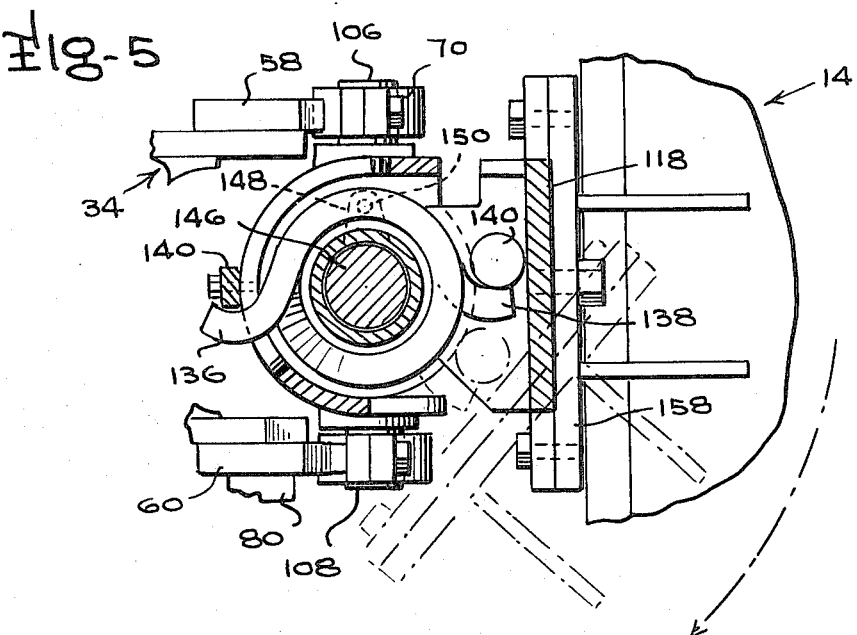
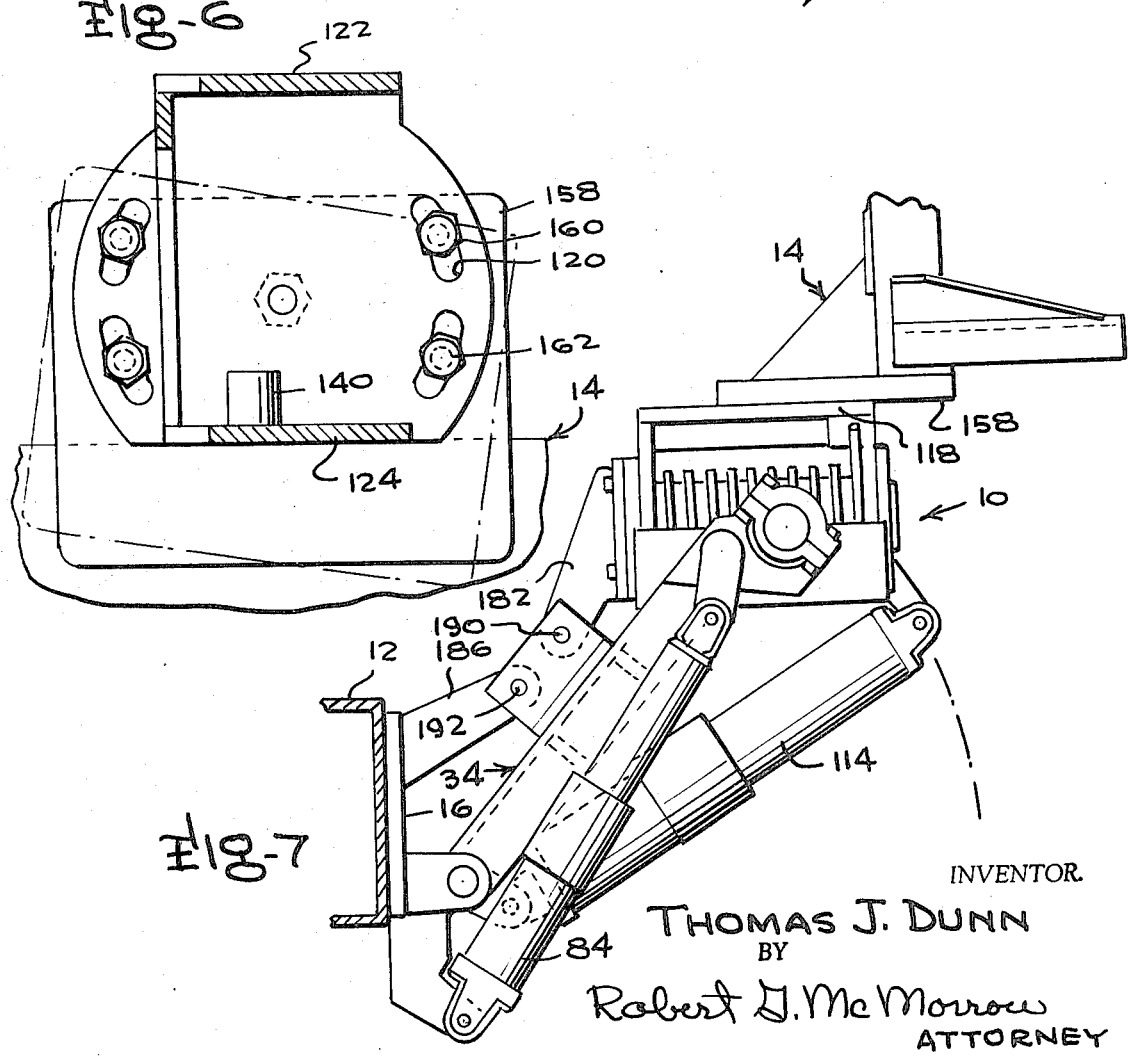

MOUNTING ASSEMBLY

BACKGROUND OF THE INVENTION

1. Field of the Invention

This invention relates to breakaway mounts for the attachments of implements to prime movers, as for example, apparatus employed to connect a mower or the like to a tractor.

2. Statement of the Prior Art

It has heretofore been known to provide hinged or breakaway mounts of the type which permit a side mounted implement to pivot or yield upon impact with another object. Illustrative of such units are those shown in my prior U.S. Pat. Nos. 3,135,079 and 2,729,044.

SUMMARY OF THE INVENTION

The present invention supplies a mounting assembly providing remotely controlled lift functions controlling both the angularity of the implement with respect to the prime mover, and the elevation height of the implement. Combined with this dual feature is the breakaway function, the return of the implement to the selected operating position being accomplished automatically after the obstruction is passed.

The assembly hereof includes components permitting locking of the implement in elevated position for transport, and for partial locking of the implement mount in either a tilted or an elevated position. Further included is means for the securing of the implement to the mount at a pre-oriented relative angle.

Further objectives include the provision of an assembly of components which is non-complex in nature permitting ease of servicing and simplicity of operation, and one which is composed of easily manufactured parts.

Other and further objects and advantages of the invention will become apparent to those skilled in the art from a consideration of the following specification when read in conjunction with the annexed drawings.

BRIEF DESCRIPTION OF THE DRAWINGS

FIG. 1 is a top plan view showing a mounting assembly constructed and assembled in accordance with the teachings of this invention;

FIG. 2 is a side elevational view from the trailing side of the assembly;

FIG. 3 is a disassembled perspective view of the components;

FIG. 4 is an enlarged longitudinal sectional view taken substantially on line 4—4 of FIG. 1, looking in the direction of the arrows;

FIG. 5 is a transverse top sectional view on line 5–5 of FIG. 4, looking in the direction of the arrows;

FIG. 6 is a vertical cross-sectional view on line 6–6 of FIG. 4, looking in the direction of the arrows; and FIG. 7 is a view similar to FIG. 2, but showing the components in locked transport position.

DESCRIPTION OF THE PREFERRED EMBODIMENT

Referring to the drawings in more detail, the mounting assembly 10 hereof is shown as mounted on the side sub-frame 12 of a prime mover, such as a tractor. The mount is used to operatively secure an implement 14, such as a heavy duty mower, to the prime mover.

The mounting assembly 10 includes a substantially rectangular mounting plate 16 fixedly secured to the sub-frame 12 in a vertical side position. A pair of longitudinal, spaced heavy duty lugs 18 and 20 project outwardly from the plate, and the lugs have coaxial, longitudinally extending bores 22, 24 formed therein. Secured to the plate adjacent the lugs are connection arms 26, 28 each having an outwardly angled portion with openings 30, 32, respectively, formed therein.

A major component of the apparatus is an elongated hinge plate 34 having an inboard end 36 and an outboard end 38. The end 38 is inwardly cut out to form a semi-circular slot 40.

An elongated, tubular sleeve 42 is secured to the inboard end 38 of the plate, and the sleeve has a longitudinal bore 44 aligned, in the assembled mount, with the bores 22 and 24 of the lugs 18 and 20. A central bracket 46 depends from the sleeve at a mid-point location. The sleeve, carrying the affixed hinge plate 34, is hingedly mounted on the mounting plate between the lugs 18 and 20 by a hinge pintle pin 48 which extends through the bores 22, 44 and 24. The hinge plate is rigidified and strengthened by side walls 50 and 52, and central ribs 54, 56.

Support brackets means is provided on the outboard end of the plate at each side thereof. The support bracket means comprise bracket plates 58, 60 fixedly secured, as by welding, to the distal ends of the side walls 50 and 52. Interior halves 62, 64 of split collars are secured to the bracket plates, and the outer halves 66, 68 thereof are adjustable by means of nuts 70, 72. Each of the collar assemblies has a bearing 74, 76 therein. It is to be noted that the brackets are secured on either side of the slot 40, permitting access thereto. A pair of inwardly extending links 78, 80 extend from the plates 58 and 60, and each has an opening at its inward end.

Means for effecting pivotal movement of the hinge plate and associated components about the pintle 48 comprises a first pair of extensible and retractable hydraulic cylinders 82, and 84. The cylinders are pivotally mounted at their ends to the connection arms 26 and 28 and the links 78 and 80 by cross pins extending through the openings therein and in the ends of the cylinders.

Referring to FIG. 3, a second important component of the invention shown therein is a spring case 86. The case 86 includes a flat, normally horizontal base 88 with a generally central opening 90, and having a smaller opening 92 therein. A side wall 94 of substantially semi-circular plan forms extends between the base 88 and the top wall 96. The side wall has a longitudinally extending slot 98 adjacent its upper end, and the top wall has a central opening 100 aligned with the base opening 90. Diametrically opposite axle mounting blocks 102, 104 are fixedly secured to the side wall, and cylindrical stub axles 106, 108 are secured thereto. The stub axles, in the assembled mount, are journalled in the bearings 74 and 76, the side wall 94 being disposed in the slot 40 of the plate. A bracket 110 having end openings therein depends from the case 86 in alignment with the bracket 46 of the sleeve 42. Second hydraulic cylinder means, comprising an extensible and retractable cylinder 114 is mounted between the last named brackets, pivotally at each end, and extension and retraction thereof serves to pivot the spring housing on the stub axles 106, 108 relative to the hinge plate.

An implement mounting member 116 comprises an outer vertical plate 118 with mounting slots 120 therein. Upper and lower horizontal plates 122, 124, respectively, project from the plate 118, and each has a circular portion disposed in the spring case. A hollow, vertical sleeve 126 extends between the upper and lower plates and is mounted in openings 128, 130 therein. The sleeve has a vertical bore 132.

A heavy duty coil spring 134 is disposed about the sleeve 126, the spring having a first outwardly bent end 136 and a second lower end element 138. The first end 136 extends through the slot 98 in the spring case, and as seen in FIG. 2, a vertical stop member 140 engages the end at a selected location. The member 140 is fixed, by fasteners 142, to the side wall. The lower end element 138 of the spring abuts an upstanding lug 144. Thus, the spring normally restricts pivoting of the implement mount with respect to the spring case.

The mount is maintained within the spring case by a locking pin 146 of cylindrical form. The pin carries a foot member 148 with a capscrew 150. The pin 146 extends through the base plate 90, the sleeve bore 132 and the top wall opening 100. The set pin 150 seats in the smaller opening 92 of the base.

Referring to FIG. 1, it will there be observed that the implement mount includes a stop member 152 normally abutted by the leading edge 154 of the side wall of the spring housing. This sets the normal orientation of the implement in its forward motion. When the implement strikes an obstruction, the implement mount pivots against the bias of the spring, as shown in FIG. 5. To the end of permitting this pivotal movement, the upper and lower plates of the implement mount are cut back, as at 156.

The implement 14 is provided with an attachment plate 158 having a series of apertures 160 adapted for alignment with the slots 120 of the plate 118. As shown in FIG. 6, the slots permit adjustment of the angle of mounting of the implement to the implement mount. Fasteners 162 are employed to attach the plate 158 to the plate 118.

Means for locking the implement in raised position for transport is included in the mounting apparatus, and is best shown in FIG. 7. A pair of L-shaped structural members 166, 168 are fixedly secured to the top of the hinge plate 34 in spaced relation. Each includes an upstanding member, designated 170 and 172 in the drawing. Each upstanding member has openings 174, 176 therein, the openings of the respective members being co-aligned. Secured to the top wall 96 of the spring case is a retainer 178, held in place by fasteners 180. An arm 182 projects upwardly and rearwardly from the retainer, and has an opening 184 therein. Similarly, an arm member 186 is fixedly secured, as by welding, to extend from the mounting plate 16 above the lugs 18 and 20. The arm member 186 has an opening 188 adjacent its distal end. As shown in FIGS. 4 and 7, the opening 184 of the arm 182 is co-aligned with the pair of openings 174 when the case 86 is in extreme tilted position by virtue of maximum extension of the cylinder 114. With the cylinders 82 and 84 also fully extended, the pair of openings 176 are aligned with the opening 188 of the arm 186—the arm being positioned between the upstanding members 170, 172. With the aforesaid openings aligned, lock pins 190, 192 are extended through the aligned openings, thereby maintaining the implement in extreme lifted position for transport.

I claim:

1. A mounting assembly for connecting a mower having a housing to a prime mover having a sub-frame, the assembly comprising:
    a mounting plate secured to the prime mover sub-frame;
    a pair of longitudinally spaced lugs projecting from said mounting plate, the lugs having longitudinally extending bores formed therein;
    a pair of connection arms depending from the mounting plate below the lugs, the arms having outwardly angled portions with openings formed therein;
    a hinge plate, having an inboard end and an outboard end with a semi-circular slot therein, with a sleeve fixedly secured to the inboard end;
    the sleeve having a depending bracket thereon;
    the sleeve being disposed between the lugs of the mounting plate, and a pintle extending through the sleeve and the bores of the lugs to pivotally mount the hinge plate to the mounting plate;
    a pair of support brackets fixedly mounted on the outboard end of the hinge plate on either side of said slot, each bracket having a collar thereon, the collar having longitudinally co-aligned bearings;
    an inwardly extending link secured to each of the support brackets;
    extensible and retractable hydraulic cylinder means secured between the links and the outwardly angled portions of the connection arms on said mounting plate to effect, upon extension and retraction, the pivotal movement of the hinge plate about the pintle;
    a spring case, comprising a base having a central aperture, a semi-circular side wall disposed in said slot of said hinge plate, and a top wall with a central aperture therein;
    the side wall having a longitudinally extending slot therein, and having a depending bracket;
    stub axles projecting from the side wall and engaged in the bearings of the collars;
    extensible and retractable hydraulic cylinder means connecting the bracket on the sleeve and the bracket on the case wall to effect pivotal movement of the case with respect to the hinge plate;
    an implement mounting member including an outer vertical plate and upper and lower horizontal plates, the horizontal plates being disposed within the spring case between the base and the top wall and the lower horizontal plates having a vertical lug thereon;
    the horizontal plates having co-aligned openings therein aligned with the central apertures of the base and top walls;
    a vertical sleeve fixedly secured to the horizontal plates in the openings thereof and having a central bore;
    a heavy duty coil spring about the vertical sleeve, the spring having a first end element projecting through the longitudinal slot of the side wall of the spring case, and having a second end element engaged against the upstanding lug of the lower horizontal plate; and
    a locking pin extending through the apertures in said top wall and base and through said bore of said sleeve.

2. The invention of claim 1, and:
    means to lock the hinge plate in elevated position.

3. The invention of claim 2 wherein:
    the means comprises upstanding bracket means on the plate, and ears on the case and prime mover to engage with the bracket.

4. A mounting assembly for connecting a mower having a housing to a prime mover having a side subframe, the assembly comprising:
    a mounting plate secured to the prime mover subframe;
    a substantially rectangular shaped hinge plate, having an inboard end and an outboard end and terminating at its outboard end in laterally spaced portions defining a gap therebetween;
    bracket plates fixedly secured to respective hinge plate portions;
    means for pivotably supporting the inboard end of said hinge plate to said mounting plate for pivotal movement about a horizontal axis;
    a pair of extensible and retractable hydraulic cylinder means positioned adjacent said hinge plate, each fixed at one end to one of said bracket plates and at the other end to said mounting plate for pivotal movement with respect to said mounting plate and for extension and retraction to effect pivotal movement of said hinge plate about said horizontal axis, said extensible and retractable hydraulic cylinder means applying extension and retraction forces equally to said hinge plate on each side thereof;
    a spring case having stub axles projecting from the side wall thereof;
    bearing means carried by said bracket plates for rotatably supporting said stub axles and permitting said spring case to pivot about a horizontal axis defined by said stub axles;
    extensible and retractable hydraulic cylinder means pivotally connected to said hinge plate and to said spring case to effect pivotal movement of the case about said horizontal axis with respect to the mounting plate;
    an implement mounting member including an outer vertical plate and spaced horizontal plate disposed within the spring case; and
    a heavy duty coil spring operatively coupled to said spring case and said implement mounting member for maintaining the implement mounting member at a given angular position relative to said spring case but permitting rotation of said implement mounting member about a vertical axis passing through said spring case in opposition to the bias of said spring.

5. The invention of claim 4, wherein said case is cylindrical, said implement mounting member includes a vertical sleeve, said coil spring is concentrically disposed about said sleeve and has opposite ends engaging said case and implement mounting member respectively.

6. The invention of claim 5 wherein said mounting assembly further comprises bracket means fixed to the upper side of said hinge plate, ears extending outwardly from said mounting plate and inwardly from said spring case and locking pin means for coupling respective ears to said bracket means when said hinge plate is raised to elevate position for locking the hinge plate in said elevated position.

* * * * *